United States Patent [19]

Akagi

[11] Patent Number: 5,208,115
[45] Date of Patent: May 4, 1993

[54] SOLID-ELECTROLYTE FUEL CELL SYSTEM

[75] Inventor: Kosuke Akagi, Ikoma, Japan

[73] Assignee: Osaka Gas Company Limited, Osaka, Japan

[21] Appl. No.: 900,145

[22] Filed: Jun. 17, 1992

[30] Foreign Application Priority Data

Jun. 21, 1991 [JP] Japan .................................. 3-149121

[51] Int. Cl.[5] .............................................. H01M 8/04
[52] U.S. Cl. ........................................ 429/26; 429/30; 429/34; 429/39
[58] Field of Search ...................... 429/30, 34, 38, 39, 429/26, 12, 13, 120

[56] References Cited

U.S. PATENT DOCUMENTS

| | | | |
|---|---|---|---|
| 4,342,816 | 8/1982 | Kothmann et al. | 429/38 X |
| 4,444,851 | 4/1984 | Maru | 429/26 |
| 4,574,112 | 3/1986 | Breault et al. | 429/26 X |
| 4,623,596 | 11/1986 | Kamoshita | 429/34 X |
| 4,706,737 | 11/1987 | Taylor et al. | 429/26 X |

*Primary Examiner*—Anthony Skapars
*Attorney, Agent, or Firm*—Gifford, Groh, Sprinkle, Patmore and Anderson

[57] ABSTRACT

A solid-electrolyte fuel cell system comprising a plurality of solid-electrolyte fuel cells, a plurality of oxygen gas passage devices, and a plurality of fuel gas passage devices. Each cell includes an electrolyte layer, an oxygen electrode applied to one surface of the electrolyte layer, and a fuel electrode applied to the other surface of the electrolyte layer. Each oxygen gas passage device defines oxygen-containing gas passages opposed to the oxygen electrode, and has a conductive portion. Each fuel gas passage device defines fuel passages opposed to the fuel electrode, and have a conductive portion. Adjacent cells are laminated in a conductive state through the oxygen gas and fuel gas passage devices. Certain of the fuel gas passage devices include a pair of spacers provided to maintain an adjacent gas passage device spaced apart from one of the cells, the spacers being spaced from each other to define the fuel passages, and a flexible conductive member filled between the spacers for allowing passage of a gas. The flexible conductive member has a water-cooling jacket mounted therein to be out of contact with the adjacent gas passage device and cell.

8 Claims, 3 Drawing Sheets

SOLID-ELECTROLYTE FUEL CELL SYSTEM

BACKGROUND OF THE INVENTION

1. Field of the Invention

The present invention relates to a solid-electrolyte fuel cell system. More particularly, the invention relates to a solid-electrolyte fuel cell system comprising a plurality of solid-electrolyte fuel cells each including an electrolyte layer, an oxygen electrode applied to one surface of the electrolyte layer, and a fuel electrode applied to the other surface of the electrolyte layer; a plurality of oxygen gas passage devices each defining oxygen-containing gas passages opposed to the oxygen electrode, and having a conductive portion; and a plurality of fuel gas passage devices each defining fuel passages opposed to the fuel electrode, and having a conductive portion; wherein adjacent cells are laminated in a conductive state through the oxygen gas and fuel gas passage devices.

2. Description of the Related Art

Conventionally, an oxygen-containing gas preheated by exhaust gas is supplied in an amount far greater than a theoretical amount necessary for electricity generation, in order to remove heat generated in the cells. Thus, the oxygen-containing gas is used also as cooling gas to cool the cells and maintain the cells at a predetermined temperature.

However, cooling with the oxygen-containing gas produces a great temperature difference between gas inlet and outlet of the cell. This results in a sharp temperature gradient of the cell, leading to its thermal deformation. Thus, there is room for improvement with respect to durability.

Further, since an enormous amount of oxygen-containing gas is supplied, which results in an enormous amount of exhaust, a large and expensive heat exchanger is needed to preheat the oxygen-containing gas with exhaust gas. A great heat loss also occurs through exhaust. Thus, the conventional system has room for improvement from the points of view of economy and installation.

SUMMARY OF THE INVENTION

The present invention has been made with regard to the state of the art noted above, and its object is to provide a solid-electrolyte fuel cell system having improved means for preventing a temperature increase due to heating of the cells, thereby promoting durability. Such a system requires only a small and inexpensive heat exchanger for preheating the oxygen-containing gas, does not require a waste heat boiler, and is capable of drastically reducing the heat loss through the exhaust gas, with an excellent cooling efficiency.

The above object is fulfilled, according to the present invention, by a solid-electrolyte fuel cell system in which the oxygen gas passage devices or the fuel gas passage devices include a pair of spacers provided to maintain an adjacent gas passage device spaced apart from one of the cells, the spacers being spaced from each other to define the passages, and a flexible conductive member filled between the spacers for allowing passage of a gas, the flexible conductive member having a water-cooling guide mounted therein to be out of contact with the adjacent gas passage device and one of the cells.

With this construction, a gas-liquid mixture of water and water vapor is passed through the water-cooling guide to cool the cell by means of the latent heat of water evaporation. Consequently, there occurs little temperature difference between inlet and outlet of the cell, thereby minimizing a temperature gradient of the cell. This effectively eliminates thermal deformation and promotes durability.

Since each cell is cooled by the cooling action of the fluid guide as noted above, the oxygen-containing gas may be supplied in a drastically reduced amount to the cell compared with the prior art. The amount of oxygen-containing gas supply may be approximated to the theoretical amount needed for electricity generation, and hence exhaust may also be drastically reduced.

The drastic reduction in the amount of oxygen-containing gas supply and exhaust allows a very small and inexpensive heat exchanger to be used for preheating the oxygen-containing gas with the exhaust, and dispenses with a waste heat boiler. This provides the advantage in terms of installation cost and space. The drastic reduction in the amount of exhaust gas means a drastic reduction in heat loss, and this improved thermal efficiency enables a reduction in running cost.

As noted above, the flexible conductive member is filled between the spacers for allowing passage of the gas. This conductive member is in contact with an adjacent gas passage device and cell. Thus, the flexible conductive member is capable of enlarging a sectional area of an electric passage between the adjacent gas passage device and cell. The flexible conductive member maintains the fluid guide out of contact with the adjacent gas passage device and cell. Where the gas passage device is formed of a conductive material such as conductive ceramic, and the fluid guide is formed of a metal, for example, this construction prevents a thermal shock resulting from the fluid guide contacting the adjacent gas passage device or cell. Further, the flexible conductive member absorbs a difference in thermal expansion between ceramic and metal, and promotes heat transfer from the adjacent gas passage device and cell to the fluid guide.

Thus, the present invention provides a solid-electrolyte fuel cell system not only capable of preventing an abnormal temperature increase of the cells, but assuring excellent durability, and excellent economy with reduced installation and running cost. This system is small with advantage in installation space, and has an excellent cooling performance as well.

Further objects, features and effects of the invention will become apparent from the following more detailed description of the embodiments of the invention taken with reference to the accompanying drawings.

DETAILED DESCRIPTION OF THE PREFERRED EMBODIMENTS

A solid-electrolyte fuel cell system according to the present invention will be described in detail with reference to the drawings.

Figure 1:
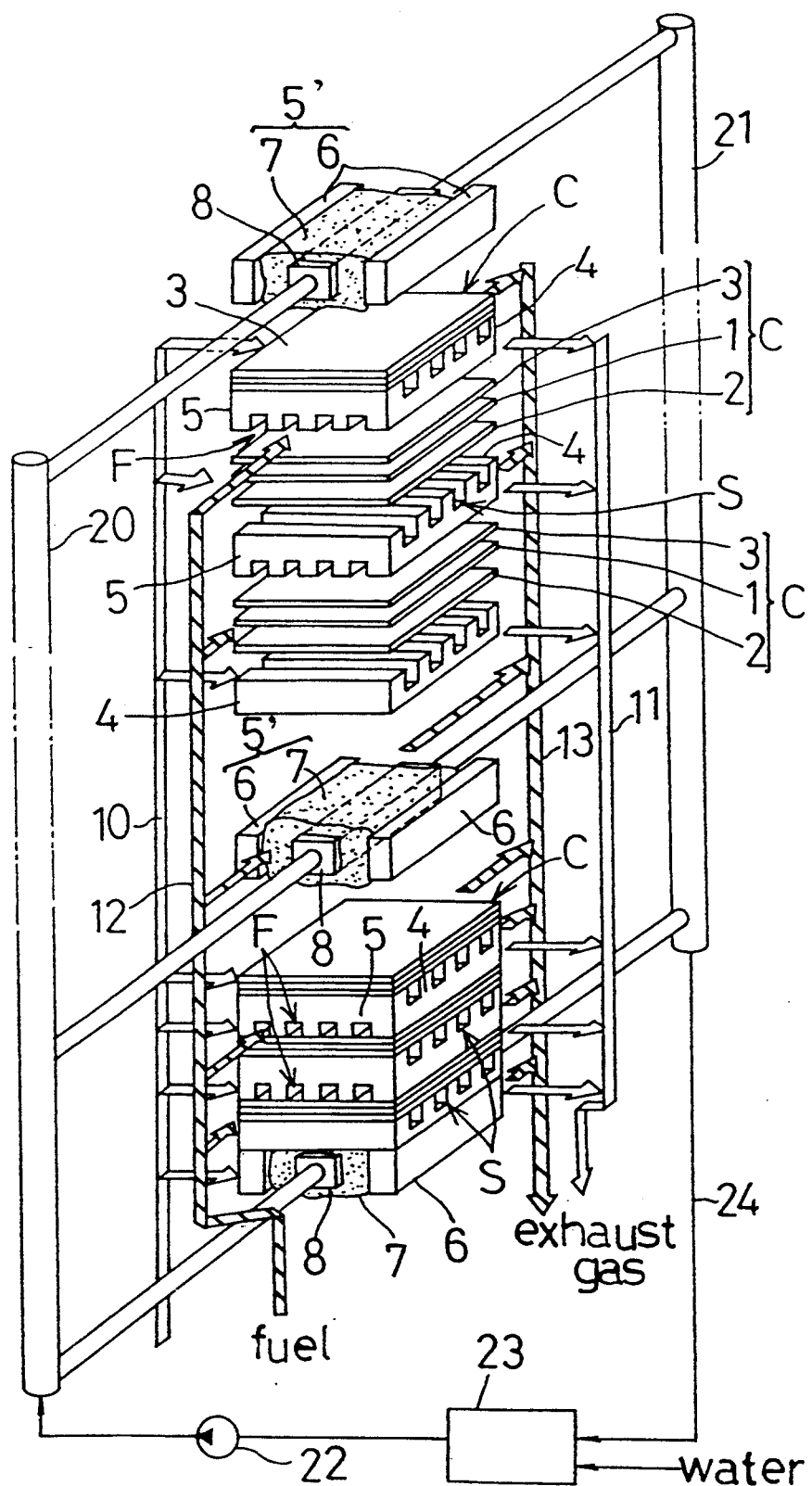
FIG. 1 is a perspective view of a principal portion of a solid-electrolyte fuel cell system according to the present invention.
Figure 2:
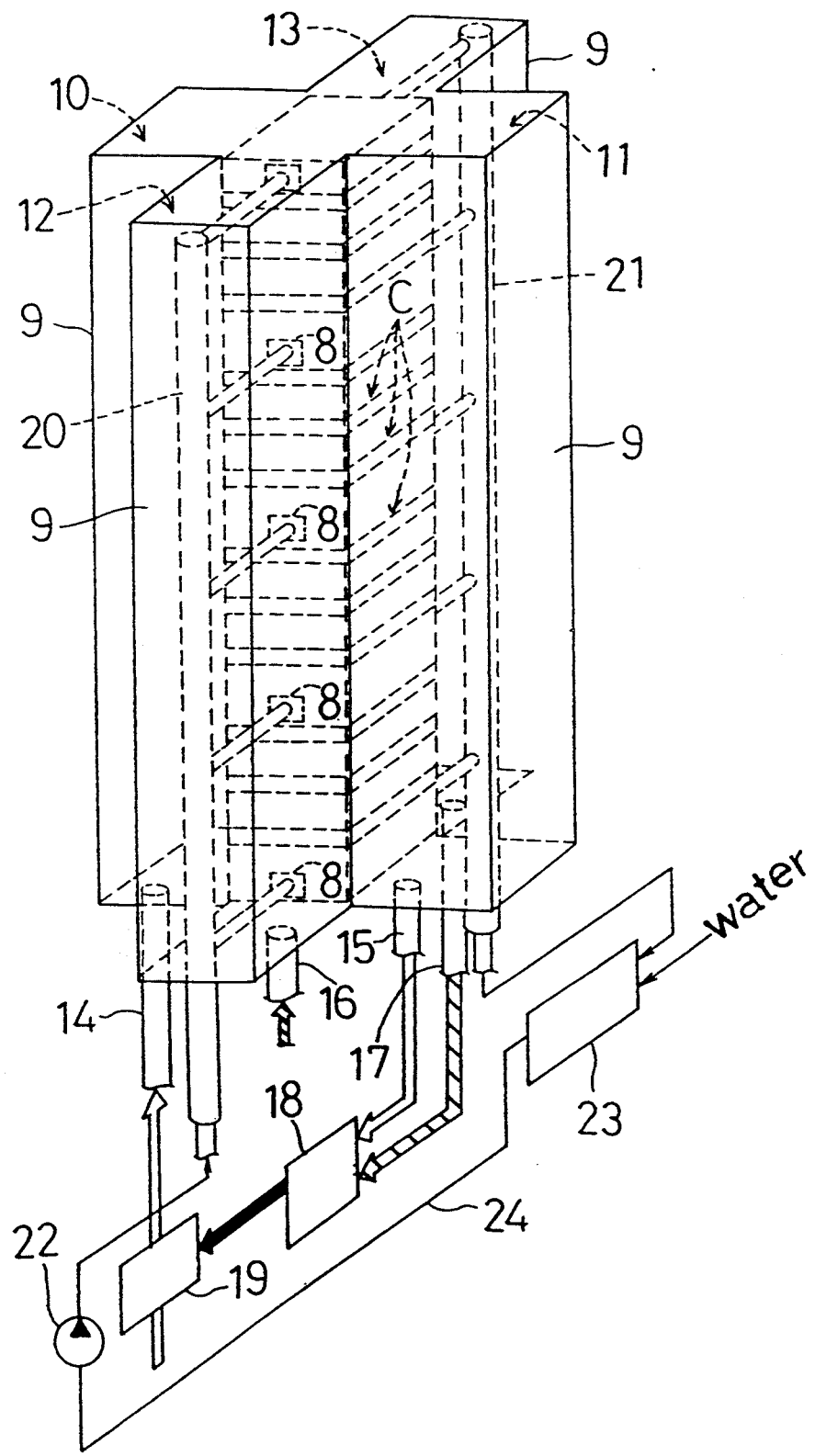
FIG. 2 is a perspective view showing supply passage devices attached to the cell system.

Referring to FIGS. 1 and 2, the illustrated system includes a plurality of solid-electrolyte fuel cells C. Each cell C has an electrolyte layer 1 in the form of a square plate, an oxygen electrode 2 in the form of a layer or plate applied to one surface of the electrolyte layer 1 to extend substantially over an entire area thereof, and a fuel electrode 3 also in the form of a layer or plate applied to the other surface of the electrolyte layer 1 to extend substantially over the entire area thereof. Thus, the cell C derives an electromotive force from the oxygen electrode 2 and fuel electrode 3.

Besides the plurality of cells C, the system includes a plurality of oxygen gas passage devices 4 and a plurality of fuel gas passage devices 5 and 5'. Each of the oxygen gas passage devices 4 defines oxygen-containing gas passages S opposed to the oxygen electrode 2, and includes a conductive portion. Each of the fuel gas passage devices 5 and 5' defines fuel passages F opposed to the fuel electrode 3, and includes a conductive portion. The cells C are laminated in a conductive state with the gas passage devices 4 and 5 arranged between adjacent cells C.

Each oxygen gas passage device 4 is formed of a conductive material such as conductive ceramic and defines a plurality of grooves acting as oxygen-containing gas passages S.

Each fuel gas passage device 5' includes a pair of spacers 6 and a flexible conductive member 7. Such fuel gas passage devices 5' are arranged at intervals of a plurality of (two in this embodiment) the other fuel gas passage devices 5. The spacers 6 are provided to maintain each fuel gas passage device 5' spaced apart from adjacent oxygen gas passage device 4 and cell C. The spacers 6 are spaced from each other to define the fuel passages F. The flexible conductive member 7 is filled between the spacers 6, and has an elastic biasing force to expand in the direction in which the components of the system are laminated. The flexible conductive member 7 is formed porous to allow passage of a fuel gas. Each of the other fuel gas passage devices 5 defines a plurality of grooves acting as the fuel passages F, and is formed of a conductive material such as conductive ceramic.

The flexible conductive member 7 has a metallic water-cooling jacket 8 mounted therein to be out of contact with adjacent oxygen gas passage device 4 and cell C.

The flexible conductive member 7 promotes heat transfer from the adjacent oxygen gas passage device 4 and cell C to the water-cooling jacket 8 acting as a water-cooling fluid guide, and secures a sectional area for an electric passage between the oxygen gas passage device 4 and cell C.

The flexible conductive member 7 is formed of a felt-like nickel material or other appropriate material that has a flexibility to absorb thermal stress and an elastic biasing force to provide an excellent electrical connection between adjacent oxygen gas passage device 4 and cell C.

As shown in FIG. 2, a box-like supply passage device 9 is attached to a plane having inlets of the oxygen-containing gas passages S. The supply passage device 9 defines an oxygen-containing gas supply passage 10 communicating with the inlets of the oxygen-containing gas passages S. Another supply passage device 9 is attached to a plane having outlets of the oxygen-containing gas passages S. This supply passage device 9 defines an oxygen-containing gas exhaust passage 11 communicating with the outlets of the oxygen-containing gas passages S. A further supply passage device 9 is attached to a plane having inlets of the fuel passages F. This supply passage device 9 defines a fuel supply passage 12 communicating with the inlets of the fuel passages F. A fourth supply passage device 9 is attached to a plane having outlets of the fuel passages F. This supply passage device 9 defines a fuel exhaust passage 13 communicating with the outlets of the fuel passages F.

An oxygen-containing gas supply pipe 14, an oxygen-containing gas exhaust pipe 15, a fuel supply pipe 16 and a fuel exhaust pipe 17 are connected to bottoms of the respective supply passage devices 9. These pipes 14–17 communicate with the oxygen-containing gas supply passage 10, oxygen-containing gas exhaust passage 11, fuel supply passage 12 and fuel exhaust passage 13, respectively.

The oxygen-containing gas exhaust pipe 15 and fuel exhaust pipe 17 are connected to a combustor 18. The combustor 18 supplies a hot exhaust gas to a heat exchanger 19 for preheating an oxygen-containing gas flowing into the oxygen-containing gas supply pipe 14 and supply passage 10.

The fuel supply passage 12 contains a water supply header 20 connected to the respective jackets 8. The fuel exhaust passage 13 contains a water drainage header 21 also connected to the respective jackets 8. One end of each header 20 or 21 extends through the supply passage device 9. The headers 20 and 21 are connected to a circulating passage 24 including a pump 22 and gas-liquid separator 23. A gas-liquid fluid mixture including water and water vapor is circulated through the water-cooling jackets 8 to cool the cells C with the latent heat of water evaporation, thereby maintaining the cells C at a predetermined temperature.

A different embodiment will be described next.

Figure 3:
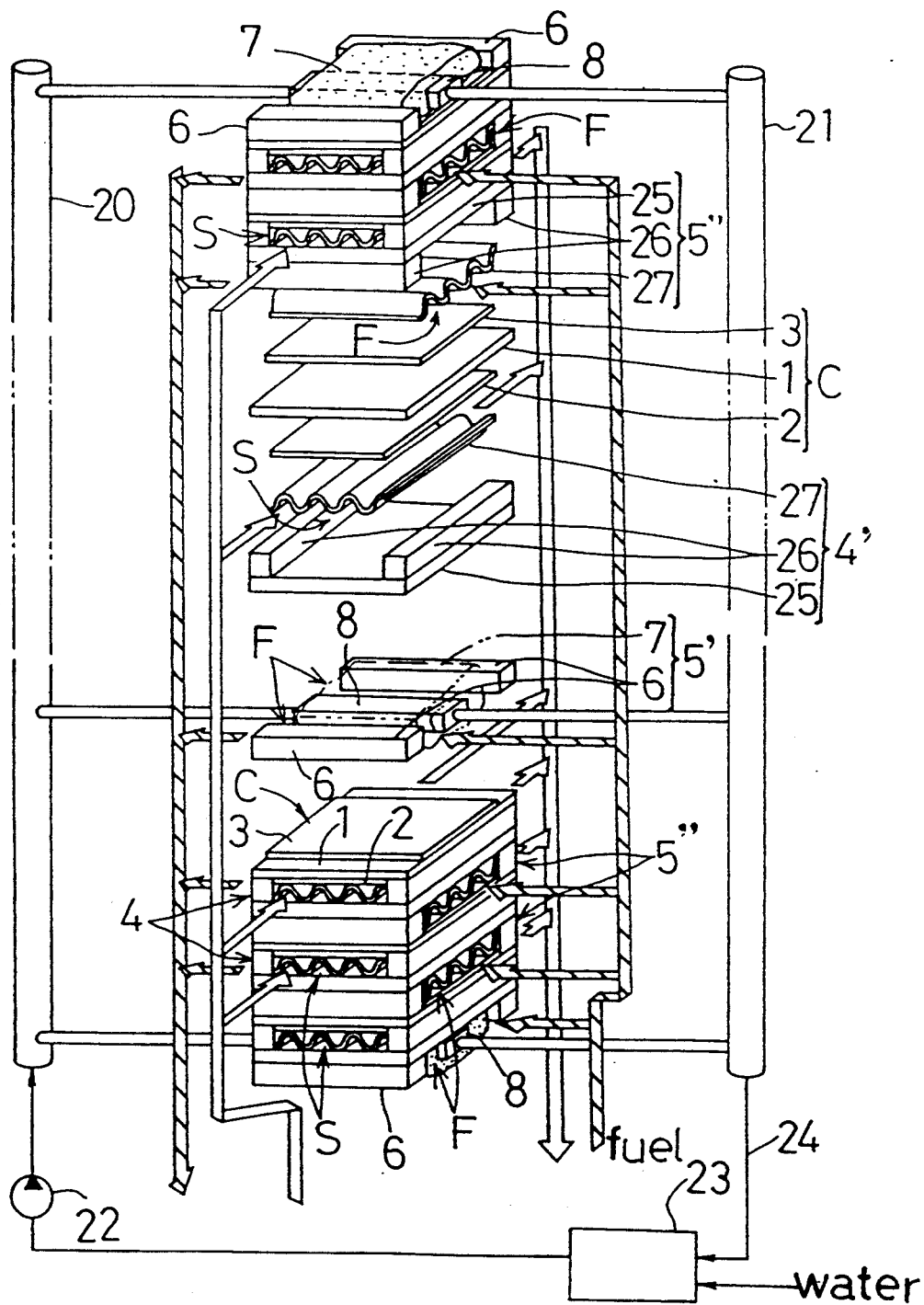
FIG. 3 is a perspective view of a principal portion of a solid-electrolyte fuel cell system in a different embodiment of the invention.

Referring to FIG. 3, this system also includes a plurality of solid-electrolyte fuel cells C. Each cell C has an electrolyte layer 1 in the form of a square plate, an oxygen electrode 2 in the form of a layer or plate applied to one surface of the electrolyte layer 1 to extend substantially over an entire area thereof, and a fuel electrode 3 also in the form of a layer or plate applied to the other surface of the electrolyte layer 1 to extend substantially over the entire area thereof. Thus, the cell C derives an electromotive force from the oxygen electrode 2 and fuel electrode 3.

Besides the plurality of cells C, the system includes a plurality of oxygen gas passage devices 4' and a plurality of fuel gas passage devices 5' and 5". Each of the oxygen gas passage devices 4 defines oxygen-containing gas passages S opposed to the oxygen electrode 2, and includes a conductive portion. Each of the fuel gas passage devices 5 and 5' defines fuel passages F opposed to the fuel electrode 3, and includes a conductive portion. The cells C are laminated in a conductive state with the gas passage devices 4', 5' and 5" arranged between adjacent cells C.

Each oxygen gas passage device 4' includes a conductive plate member 25, a pair of blocks 26, and a conductive corrugated member 27 mounted between the blocks 26 for electrically connecting an adjacent cell C to the plate member 25.

Each fuel gas passage device 5' includes a pair of spacers 6 and a flexible conductive member 7. Such fuel gas passage devices 5' are arranged at intervals of a plurality of (two in this embodiment) the other fuel gas passage devices 5". The spacers 6 are provided to maintain each fuel gas passage device 5' spaced apart from adjacent oxygen gas passage device 4' and cell C. The spacers 6 are spaced from each other to define the fuel passages F. The flexible conductive member 7 is filled between the spacers 6, and has an elastic biasing force to expand in the direction in which the components of the system are laminated. The flexible conductive member 7 is formed porously to allow passage of a fuel gas. Each of the other fuel gas passage devices 5" includes a conductive plate member 25, a pair of blocks 26, and a conductive corrugated member 27 mounted between the blocks 26 for electrically connecting adjacent cell C to the plate member 25. The plate member 25 is shared by adjacent oxygen gas passage device 4' and fuel gas passage device 5' or 5".

The flexible conductive member 7 has a metallic water-colling jacket 8 mounted therein to be out of contact with adjacent oxygen gas passage device 4' and cell C.

The flexible conductive member 7 promotes heat transfer from adjacent oxygen gas passage device 4' and cell C to the water-cooling jacket 8, and secures a sectional area for an electric passage between the oxygen gas passage device 4' and cell C.

The flexible conductive member 7 is formed of a felt-like nickel material or other appropriate material that has a flexibility to absorb thermal stress and an elastic biasing force to provide an excellent electrical connection between adjacent oxygen gas passage device 4' and cell C.

This embodiment is the same as the preceding embodiment in the construction for supplying and exhausting the oxygen-containing gas and fuel, and in the construction for circulating the gas-liquid mixture of water and water vapor through the cooling jackets 8.

Other embodiments are set forth hereunder.

(1) One in a predetermined number of the oxygen gas passage devices 4 or 4' may include a pair of spacers 6 and a flexible conductive member 7. The spacers 6 are provided to maintain adjacent fuel gas passage device 5, 5' or 5" spaced apart from cell C., and are spaced from each other to define oxygen-containing gas passages S. The flexible conductive member 7 is filled between the spacers 6, and has an elastic biasing force to expand in the direction in which the components of the system are laminated. The flexible conductive member 7 is formed porously to allow passage of the oxygen-containing gas. The flexible conductive member 7 has a water-cooling jacket 8 mounted therein to be out of contact with adjacent fuel gas passage device 5, 5' or 5" and cell C.

(2) One in a predetermined number of the oxygen gas passage devices 4 or 4' and one in a predetermined number of the fuel gas passage device 5, 5' or 5" may each include a pair of spacers 6 and a flexible conductive member 7, with a water-cooling jacket 8 mounted in the flexible conductive member 7.

(3) In the foregoing embodiments, the flexible conductive member 7 is formed porously to allow passage of a gas. However, the flexible material may be in any other form to allow passage of a gas.

(4) In the foregoing embodiments, the flexible conductive member 7 has an elastic biasing force to expand in the direction in which the components of the system are laminated, to provide an excellent electrical connection between adjacent gas passage device 4, 4', 5, 5' or 5" and cell C. However, the flexible conductive member 7 may have any other characteristic to achieve an excellent electrical connection between adjacent gas passage device 4, 4', 5, 5' or 5" and cell C.

What is claimed is:

1. A solid-electrolyte fuel cell system comprising:
a plurality of solid-electrolyte fuel cells each including an electrolyte layer, an oxygen electrode applied to one surface of said electrolyte layer, and a fuel electrode applied to the other surface of said electrolyte layer;
a plurality of oxigen gas passage devices each defining oxygen-containing gas passages opposed to said oxygen electrode, and having a conductive portion; and
plurality of fuel gas passage devices each defining fuel passages opposed to said fuel electrode, and having a conductive portion;
wherein adjacent cells are laminated in a conductive state through the oxigen gas and fuel gas passage devices; and
said oxygen gas passage devices or said fuel gas passage devices include a pair of spacers provided to maintain an adjacent gas passage device spaced apart from one of said cells, said spacers being spaced from each other to define the passages, and a flexible conductive member filled between said spacers for allowing passage of a gas;
said flexible conductive member having a water-cooling guide mounted therein to be out of contact with said adjacent gas passage device and said one of said cells.

2. A solid-electrolyte fuel cell system as claimed in claim 1, wherein said oxygen gas and fuel gas passage devices disposed between adjacent cells comprise a conductive member having a plurality of grooves acting as said oxygen-containing gas passages and a plurality of grooves acting as said fuel passages, respectively.

3. A solid-electrolyte fuel cell system as claimed in claim 2, further comprising box-like supply passage devices attached, respectively, to a plane having inlets of said oxygen-containing gas passages for defining an oxygen-containing gas supply passage communicating with said inlets of said oxygen-containing gas passages, to a plane having outlets of said oxygen-containing gas passages for defining an oxygen-containing gas exhaust passage communicating with said outlets of said oxygen-containing gas passages, to a plane having inlets of said fuel passages for defining a fuel supply passage communicating with said inlets of said fuel passages, and to a plane having outlets of said fuel passages for defining a fuel exhaust passage communicating with said outlets of said fuel passages.

4. A solid-electrolyte fuel cell system as claimed in claim 3, wherein said water-cooling guide is a metallic water-cooling jacket.

5. A solid-electrolyte fuel cell system as claimed in claim 4, wherein said fuel supply passage contains a water supply header connected to said water-cooling jacket, and said fuel exhaust passage contains a water drainage header connected to said water-cooling jacket, one end of each header extending through a corresponding one of the supply passage devices.

6. A solid-electrolyte fuel cell system as claimed in claim 1, wherein each of said oxygen gas passage devices and said fuel gas passage devices includes a conductive plate member, a pair of blocks, and a conductive corrugated member mounted between said blocks for electrically connecting adjacent cell to said plate member.

7. A solid-electrolyte fuel cell system as claimed in claim 6, wherein said water-cooling guide is a metallic water-cooling jacket.

8. A solid-electrolyte fuel cell system as claimed in claim 7, wherein said fuel supply passage contains a water supply header connected to said water-cooling jacket, and said fuel exhaust passage contains a water drainage header connected to said water-cooling jacket, one end of each header extending through a corresponding one of the supply passage devices.

* * * * *

UNITED STATES PATENT AND TRADEMARK OFFICE
CERTIFICATE OF CORRECTION

PATENT NO. : 5,208,115
DATED : May 4, 1993
INVENTOR(S) : Kosuke Akagi

It is certified that error appears in the above-identified patent and that said Letters Patent is hereby corrected as shown below:

Column 6, line 16, change "oxigen" to --oxygen--

Signed and Sealed this

Third Day of May, 1994

Attest:

BRUCE LEHMAN

Attesting Officer

Commissioner of Patents and Trademarks